US009726033B2

(12) United States Patent
Gendraud et al.

(10) Patent No.: US 9,726,033 B2
(45) Date of Patent: Aug. 8, 2017

(54) ROTOR WHEEL FOR A TURBINE ENGINE

(71) Applicant: SNECMA, Paris (FR)

(72) Inventors: Alain Dominique Gendraud, Vernou la Celle sur Seine (FR); Fabrice Marcel Noel Garin, Boissise la Bertrand (FR); Romain Nicolas Lunel, Montereau sur le Jard (FR)

(73) Assignee: SNECMA, Paris (FR)

( * ) Notice: Subject to any disclaimer, the term of this patent is extended or adjusted under 35 U.S.C. 154(b) by 423 days.

(21) Appl. No.: 14/357,113

(22) PCT Filed: Nov. 12, 2012

(86) PCT No.: PCT/FR2012/052593
§ 371 (c)(1),
(2) Date: May 8, 2014

(87) PCT Pub. No.: WO2013/072605
PCT Pub. Date: May 23, 2013

(65) Prior Publication Data
US 2014/0308133 A1    Oct. 16, 2014

(30) Foreign Application Priority Data
Nov. 15, 2011 (FR) ...................... 11 60394

(51) Int. Cl.
*F01D 5/30* (2006.01)
*F01D 11/00* (2006.01)
*F01D 5/32* (2006.01)

(52) U.S. Cl.
CPC .......... *F01D 11/006* (2013.01); *F01D 5/3015* (2013.01); *F01D 5/3007* (2013.01);
(Continued)

(58) Field of Classification Search
CPC ...... F01D 11/006; F01D 11/001; F01D 5/326; F01D 5/30; F01D 5/3007; F05D 2250/231; F05D 2260/30
(Continued)

(56) References Cited

U.S. PATENT DOCUMENTS 2,948,505 A     8/1960   Sonder
3,023,998 A  *  3/1962   Sanderson, Jr. ...... F01D 5/3007
                                                      415/173.7
(Continued)

FOREIGN PATENT DOCUMENTS

EP    0370899 A1   5/1990
EP    1801354 A2   6/2007
(Continued)

OTHER PUBLICATIONS

International Search Report issued Jan. 10, 2013 in PCT/FR2012/052593 filed on Nov. 12, 2012.

Primary Examiner — Michael R Reid
Assistant Examiner — Christopher Ballman
(74) Attorney, Agent, or Firm — Oblon, McClelland, Maier & Neustadt, L.L.P.

(57) ABSTRACT

A rotor wheel for a turbine engine, such as an airplane turboprop or turbojet, the rotor wheel including a rotor disk including teeth at its outer periphery defining slots for axially mounting and radially retaining blade roots. An annular lip includes an annular rim extending axially downstream from and radially towards an inside of a radial retaining mechanism formed to project axially from an upstream face of the disk, and a sealing mechanism is arranged radially inside the annular lip and upstream ends of platforms of the blades.

8 Claims, 2 Drawing Sheets

(52) U.S. Cl.
CPC ............ *F01D 5/326* (2013.01); *F01D 11/001* (2013.01); *F05D 2240/55* (2013.01); *F05D 2250/231* (2013.01); *F05D 2250/232* (2013.01); *F05D 2260/30* (2013.01); *Y02T 50/672* (2013.01)

(58) Field of Classification Search
USPC .......... 416/193 A, 219 R, 220 A, 220 R, 221
See application file for complete search history.

(56) References Cited

U.S. PATENT DOCUMENTS

| | | | | |
|---|---|---|---|---|
| 3,897,168 A | * | 7/1975 | Amos | F04D 27/023 415/115 |
| 4,171,930 A | | 10/1979 | Brisken et al. | |
| 4,344,740 A | * | 8/1982 | Trenschel | F01D 5/3015 416/193 A |
| 4,470,756 A | * | 9/1984 | Rigo | F01D 5/3015 416/219 R |
| 4,566,857 A | * | 1/1986 | Brumen | F01D 5/326 416/220 R |
| 4,846,628 A | * | 7/1989 | Antonellis | F01D 11/006 416/220 R |
| 5,018,941 A | * | 5/1991 | Heurtel | F01D 5/303 416/217 |
| 5,049,035 A | | 9/1991 | Marlin | |
| 5,173,024 A | * | 12/1992 | Mouchel | F01D 5/066 416/220 R |
| 5,257,909 A | * | 11/1993 | Glynn | F01D 5/3015 416/219 R |
| 8,038,405 B2 | * | 10/2011 | Ward | F01D 11/006 416/219 R |
| 2002/0018719 A1 | * | 2/2002 | Arilla | F01D 5/3015 416/220 R |
| 2005/0042108 A1 | * | 2/2005 | Benderradji | F01D 5/3015 416/221 |
| 2005/0232772 A1 | | 10/2005 | Race et al. | |
| 2007/0059163 A1 | * | 3/2007 | Tiemann | F01D 5/3015 415/174.5 |
| 2007/0148000 A1 | | 6/2007 | Marusko et al. | |
| 2007/0258816 A1 | | 11/2007 | Bouchard et al. | |
| 2008/0181767 A1 | * | 7/2008 | Brillert | F01D 5/081 415/170.1 |
| 2009/0104036 A1 | | 4/2009 | Fabre | |
| 2009/0297350 A1 | * | 12/2009 | Augustine | F01D 11/006 416/192 |
| 2009/0322036 A1 | * | 12/2009 | Halling | F01D 11/005 277/434 |
| 2010/0166560 A1 | | 7/2010 | Blanchard et al. | |
| 2011/0027103 A1 | * | 2/2011 | Philippot | F01D 5/081 416/97 R |

FOREIGN PATENT DOCUMENTS

| | | |
|---|---|---|
| EP | 2053199 A1 | 4/2009 |
| FR | 2413543 A1 | 7/1979 |
| FR | 2940353 A1 | 6/2010 |
| JP | 6-307202 A | 11/1994 |
| RU | 2 281 420 C2 | 8/2006 |

\* cited by examiner

ROTOR WHEEL FOR A TURBINE ENGINE

BACKGROUND OF THE INVENTION

Field of the Invention

The present invention relates to a rotor wheel for a turbine engine such as an airplane turboprop or turbojet.

Description of the Related Art

Conventionally, a rotor wheel, for example in a low-pressure turbine, comprises a rotor disk with an outer periphery having teeth that define slots for axially mounting and radially retaining blade roots. The blades are formed with platforms that are arranged circumferentially side-by-side and that define the inside of an annular passage for fluid flow.

The blades also include annular lips extending substantially axially upstream from the platforms in order to limit fluid passing out from the annular passage.

Metal blades are made as single pieces by casting, with the lips being formed together with the platforms and the blade roots.

Fabricating blades by casting enables good dimensional tolerances to be obtained, i.e. enables parts to be obtained that have accurate dimensions corresponding substantially to specifications. Nevertheless, such blades are heavy.

In order to remedy that drawback, proposals have been made to make blades in full or in part out of ceramic matrix composite material (CMC). Nevertheless, fabrication tolerances for blades made of CMC are greater than tolerances for metal blades made by casting. Furthermore, fabricating blades out of CMC is a complex process since it makes use of weaving and requires two layers of texture to be formed on the blade at platform level, one of which constitutes the surface defining the flow passage and the lip, and the other of which serves to prevent the blade from tilting and to provide downstream overlap. In patent application FR 10/54163, the Applicant has already proposed making the lip in the form of a separate fitting in order to simplify the fabrication of blades out of CMC. Sealing means are arranged between the lip and the platforms of the blades in order to avoid leaks while also accommodating the fabrication tolerances for blades made of CMC.

In that configuration, while the turbine engine is in operation, the lip is centrifuged outwards and comes to bear against the upstream ends of the platforms of the blades, thereby leading to an increase in the radial forces applied to the blades.

BRIEF SUMMARY OF THE INVENTION

A particular object of the invention is to provide a solution to this problem that is simple, effective, and inexpensive.

For this purpose, the invention proposes a rotor wheel for a turbine engine such as an airplane turboprop or turbojet, the wheel comprising a rotor disk having teeth at its outer periphery defining slots for axially mounting and radially retaining blade roots, the blades including platforms arranged circumferentially end to end to define an annular flow passage for an air stream, an annular lip extending substantially axially upstream being fitted on an upstream face of the disk to limit air passing out from the annular passage, sealing means being provided between the annular lip and the upstream ends of the platforms of the blades, the rotor wheel being characterized in that the annular lip comprises an annular rim extending axially downstream from and radially towards the inside of radial retaining means for retaining the annular lip on the disk, these retaining means being formed to project axially from the upstream face of the disk, the sealing means being arranged radially inside the annular lip and upstream ends of the platforms of the blades.

In operation, the radial retaining means of the annular lip formed on the disk ensure that the upstream ends of the blades are not subjected to additional radial forces due to the annular lip being centrifuged.

The lip may be of continuous annular shape over 360°. It could equally well be in the form of a plurality of distinct sectors arranged end-to-end to form a ring, thereby enabling differential expansion between the disk and the lip to be well compensated.

According to a characteristic of the invention, the radial retaining means are formed at the upstream and radially outer ends of the teeth of the disk.

According to another characteristic of the invention, the annular rim of the lip comprises a substantially cylindrical wall bearing radially outwards against the radial retaining means and connected at its downstream end to a radial annular wall.

According to yet another characteristic of the invention, lugs are formed projecting axially from the upstream face of the disk, substantially at the bases of the teeth of the disk and facing the radially inner end of the radial annular rim of the lip.

While the lip is being mounted on the disk, and also while the turbine engine is stopped, the lugs serve to position the annular lip on the upstream face of the disk, and to hold it radially. In this way, the sealing means are correctly positioned relative to the lip and to the upstream ends of the platforms.

Advantageously, the radial annular wall of the rim of the lip includes at least one anti-rotation finger projecting radially inwards and engaged circumferentially between two consecutive lugs, thereby making it possible to guarantee that the annular lip is prevented from turning on the disk.

According to a characteristic of the invention, the annular lip includes an annular groove that is open downstream to house sealing means, the groove being defined internally by the cylindrical wall and externally by a frustoconical annular wall of section that increases going downstream.

In a particular embodiment of the invention, the sealing means comprise an O-ring interposed radially between the frustoconical wall and the radial retaining means projecting from the upstream face of the disk, said O-ring being suitable for moving radially outwards under the centrifugal effect during rotation of the rotor wheel and for pressing against the frustoconical wall and against the upstream ends of the platforms.

The O-ring is radially movable relative to the lip, thus making it possible by the centrifugal effect for the O-ring to press properly against the frustoconical wall and the upstream ends of the platforms.

Preferably, the O-ring is of substantially triangular section and includes a frustoconical face for coming into contact with the frustoconical wall of the lip and a substantially radial face for pressing axially against radial faces of the upstream ends of the platforms of the blades.

According to another characteristic of the invention, the annular lip is clamped axially against the rotor disk by an upstream cheek plate fastened to the rotor disk.

In known manner, the inner end of the cheek plate carries wipers forming a labyrinth seal by cooperating with a block of abradable material on a stationary nozzle arranged upstream.

In the preferred embodiment of the invention, the blades are made of ceramic matrix composite material (CMC).

The invention also provides a turbine engine such as an airplane turboprop or turbojet, the engine including at least one rotor wheel as described above, in particular in a low-pressure turbine.

BRIEF DESCRIPTION OF THE SEVERAL VIEWS OF THE DRAWINGS

Other details, characteristics, and advantages of the invention appear on reading the following description made by way of non-limiting example and with reference to the accompanying drawings, in which.

DETAILED DESCRIPTION OF THE INVENTION

Figure 1:
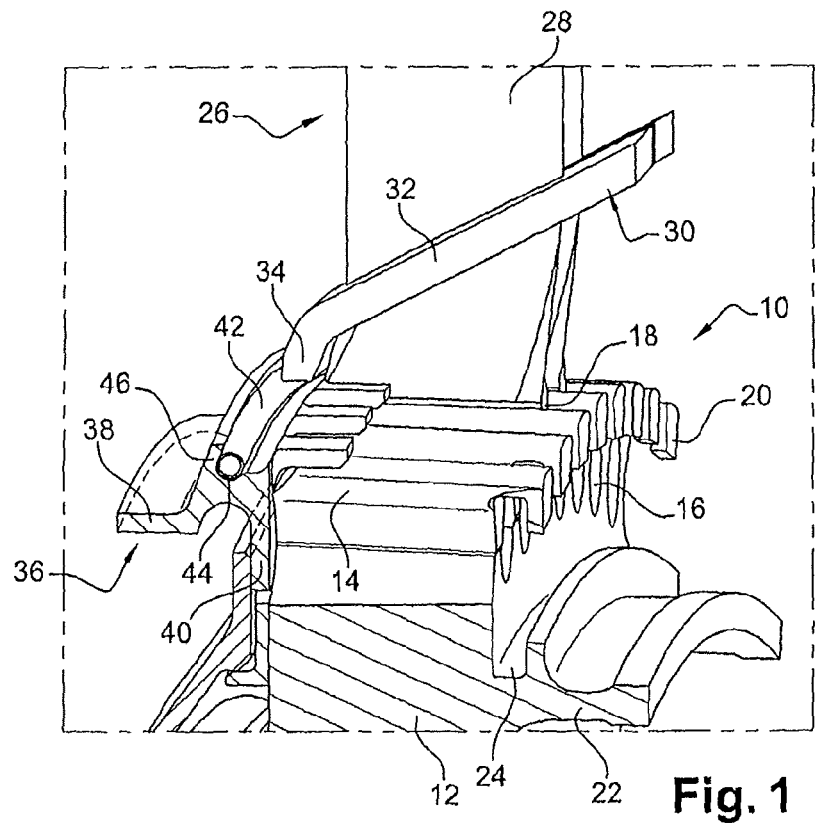
FIG. 1 is a perspective view of a portion of a prior art rotor wheel.
Figure 3:
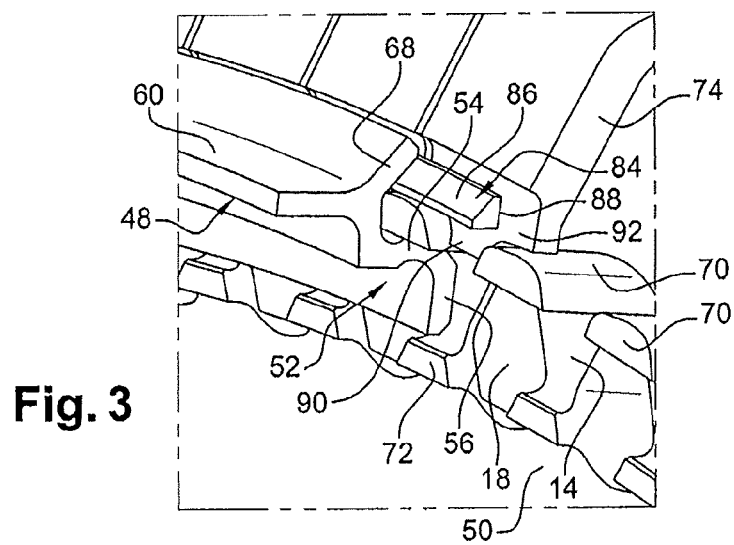
FIG. 3 is a diagrammatic perspective view of the annular lip of the invention.
Figure 4:
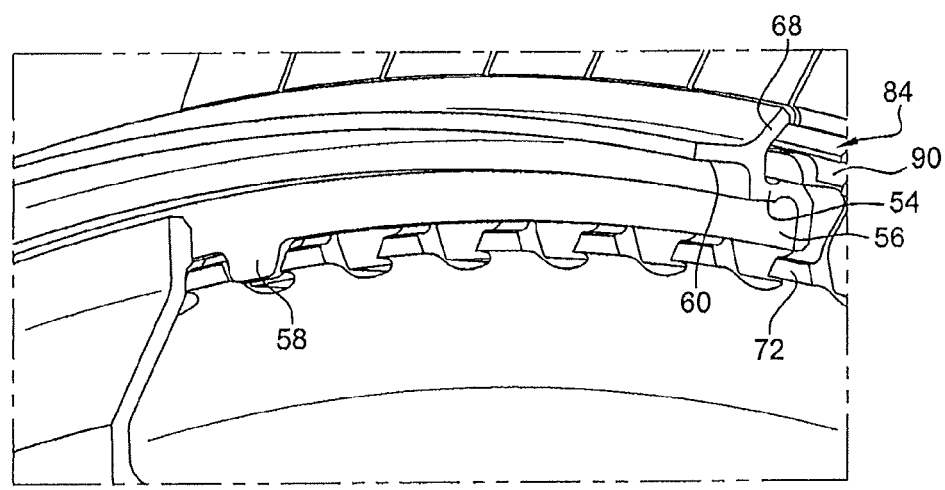
FIG. 4 is a diagrammatic perspective view from upstream of the annular lip of the invention.

FIG. 1 shows a rotor wheel 10 as described in document FR 10/54163. The rotor wheel 10 comprises a rotor disk 12 with its outer periphery carrying teeth 14 defining dovetail slots 16 for axially mounting and radially retaining blade roots 18 (FIGS. 3 and 4). The downstream ends of the teeth 14 are provided with hooks 20 that are turned radially inwards. The tops of the teeth 14 are substantially plane.

The turbine disk 12 is also provided with a cylindrical rim 22 extending axially downstream in a zone that is situated radially between the bottoms of the slots 16 and the inner periphery of the disk 12. A groove 24 situated radially substantially facing the hooks 20 is formed in the rim 22. The groove 24 and the hooks 20 are used for fastening axial stop means (not shown) for stopping the roots 18 of the blades.

The blades 26 have airfoils 28 extending radially and platforms 30 defining the inside of an annular fluid flow passage, the platforms being formed at the bases of the airfoils 28 and being connected to the roots 18 of the blades 26.

Each platform 30 has a central portion 32 that slopes relative to the axial direction, which portion is extended by an upstream portion 34 that is curved radially inwards.

The platforms 30 of the blades 26 are arranged side-by-side and means are provided for providing sealing between their facing circumferential lateral edges.

The rotor wheel 10 has a metal annular lip 36 fitted onto the upstream face of the disk 12 of the rotor at the outer periphery of the disk 12. The lip 36 has a cylindrical wall 38 extending substantially axially upstream level with the upstream ends of the platforms 30 and serving to limit any fluid passing out from the annular passage. The lip 36 also has an annular wall 40 extending substantially radially and serving to press against the upstream face of the rotor disk 12. Sealing means 42 are provided between the lip 36 and the upstream ends of the platforms 30 of the blades 26.

These sealing means comprise an O-ring 42 mounted in a groove 44 of the lip 36, which groove includes a frustoconical wall 46 of section that flares going downstream so that the O-ring is pressed from upstream to downstream against the upstream edges 34 of the platforms 30.

While the turbine engine is in operation, the lip 36 is centrifuged outwards and comes to bear via the O-ring 42 against the upstream edges 34 of the platforms 30, thereby increasing the radial forces applied to the blades 26.

The invention provides a solution to this problem by means of a lip 48 that, in operation, bears radially outwards against radial retaining means formed to project from the upstream face of the disk 50.

Figure 2:
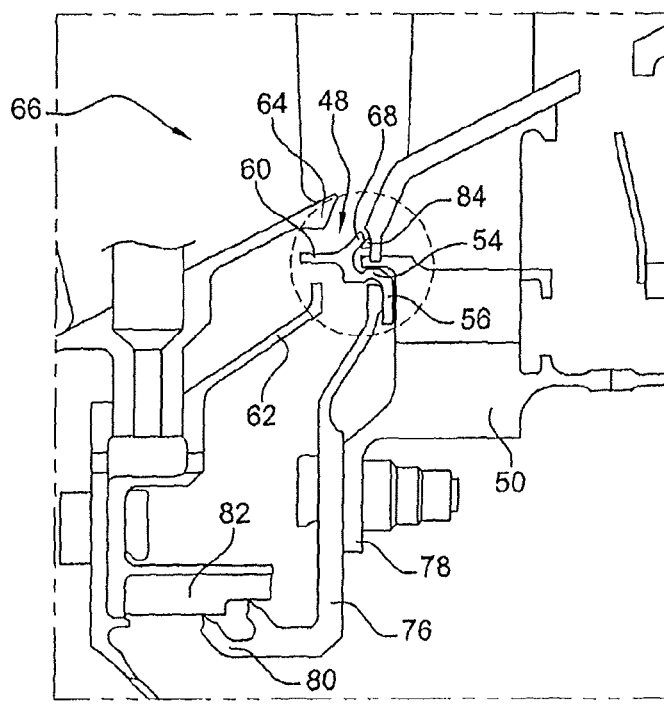
FIG. 2 is a diagrammatic axial section view of a rotor wheel of the invention.
Figure 5:
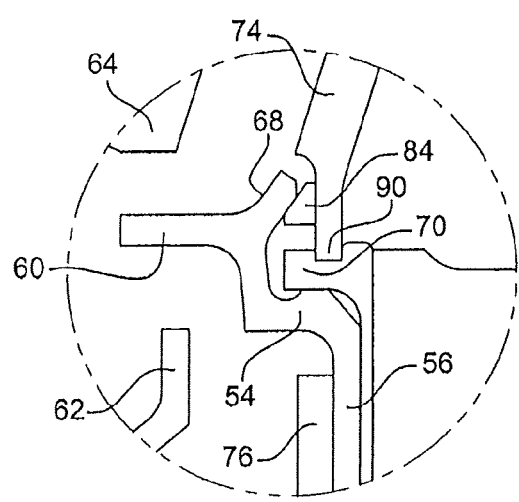
FIG. 5 is a diagrammatic axial section view of the zone outlined by a dashed line in FIG. 2.

In the embodiment shown, the lip 48 has an annular rim 52 with a substantially cylindrical wall 54 connected at its downstream end to an annular wall 56 that extends radially inwards (FIGS. 2 and 3). The radial annular wall 56 has at least one anti-rotation finger 58 projecting radially inwards (FIG. 4). The lip 48 also has a second cylindrical wall 60 extending axially upstream between two stationary annular portions 62 and 64 of a stator nozzle 66 arranged upstream, thereby limiting air passing out from the annular passage (FIGS. 2 and 5).

The cylindrical wall 54 of the annular rim 52 of the lip 48 co-operates with a frustoconical wall 68 of section that increases going downstream, and together they define an annular groove that is open downstream.

The radial retaining means comprise tabs 70 formed at the upstream and radially outer ends of the teeth 14 of the disk 50. These tabs 70 constitute extra thicknesses on the teeth 14 of the disk 50 and they project axially from the upstream face of the disk 50. Each tooth 14 of the disk 50 has a lug 72 formed substantially at the base of the tooth and facing the radially inner end of the radial annular wall 56 of the annular rim 52 of the lip 48.

When the lip 48 is axially engaged downstream on the upstream face of the disk 50, the annular rim 52 becomes housed between the tabs 70 and the lugs 72 projecting from the upstream face of the disk 50, thereby positioning the lip 48 on the disk 50. In operation, the lip 48 is retained radially by the tabs 70 of the disk 50 and no longer by the upstream edges 74 of the platforms, thereby serving to reduce the radial forces that are applied to the blades. Furthermore, the finger 58 of the radial annular wall 56 is received circumferentially between two consecutive lugs 72 of the disk 50, thereby preventing the lip 48 from turning on the disk 50. The lip 48 is clamped against the upstream face of the rotor disk 50 by a cheek plate 76 that is bolted to a radial flange 78 of the disk 50. At its inner end, the cheek plate 76 has wipers 80 that form a labyrinth seal with a block of abradable material 82 of the nozzle 66 (FIG. 2).

Sealing means 84 are interposed between the tabs 70 of the teeth 14 of the disk 50 and the frustoconical wall 68 of the lip 48.

In the embodiment shown, the sealing means comprise an O-ring 84 of substantially triangular section, with a frustoconical face 86 positioned substantially radially facing the frustoconical wall 68 of the lip 48 and with another face 88 that is radial and positioned facing the corresponding radial faces of the upstream edges 74 of the platforms.

While the turbine engine is in operation, the O-ring 84 moves along the frustoconical wall 68 under the effect of centrifugal force until it becomes pressed against the upstream edges 74 of the platforms (FIGS. 3 and 5).

The O-ring 84 is sufficiently deformable to accommodate the dimensional tolerances due to the method of fabricating blades out of CMC.

The O-ring may also be split so as to make it easier to expand under the effect of centrifugal force.

The upstream edge 74 of each platform includes a tip 90 extending substantially radially inwards and formed in the substantially middle portion of the edge 74 of the platform. While the blade roots 18 are being mounted axially in the slots 16, each of the tips 90 of the platforms engages axially between two consecutive tabs 70 of the disk 50. Each upstream edge of a platform has two lateral portions 92 on either side of the tip 90 of the platform, which portions are positioned radially facing a tab 70 of the disk 50 with a predetermined clearance. These lateral portions 92 are for bearing against the tabs 70 of the disk 50 in order to limit tilting of the blades in a circumferential direction (FIG. 3).

When the lip 48 is sectorized, each lip sector may include an anti-rotation finger 58 that co-operates circumferentially with lugs 72 of the disk 50.

The invention claimed is:

1. A rotor wheel for a turbine engine, or an airplane turboprop, or a turbojet, the rotor wheel comprising:
   a rotor disk including teeth at an outer periphery thereof defining slots for axially mounting and radially retaining roots of blades, the blades including platforms arranged circumferentially end to end to define an annular flow passage for an air stream;
   an annular lip extending substantially axially upstream fitted on an upstream face of the disk to limit air passing out from the annular passage; and
   a sealing ring provided between the annular lip and upstream ends of the platforms of the blades,
   wherein tabs are formed at upstream and radially outer ends of the teeth of the rotor disk, the tabs projecting axially upstream from the upstream face of the rotor disk,
   wherein the annular lip includes an annular rim with a first cylindrical wall and a radial annular wall extending from a downstream end of the first cylindrical wall, a frustoconical wall which cooperates with the first cylindrical wall to define an annular groove that opens downstream, and a second cylindrical wall extending upstream from the frustoconical wall and radially located between the first cylindrical wall and a free downstream end of the frustoconical wall,
   wherein each tooth of the rotor disk includes a lug provided at a base of the respective tooth and facing a radially inner end of the radial annular wall of the annular rim of the annular lip,
   wherein the annular lip is housed between the tabs and the lugs of the rotor disk, and
   wherein the sealing ring is arranged radially inside the frustoconical wall of the annular lip and the upstream ends of the platforms of the blades.

2. A rotor wheel according to claim 1, wherein the frustoconical wall radially increases along a downstream direction.

3. A rotor wheel according to claim 2, wherein the sealing ring is an O-ring configured to move radially outwards under centrifugal effect during rotation of the rotor wheel and for pressing against the frustoconical wall and against the upstream ends of the platforms of the blades.

4. A rotor wheel according to claim, wherein the O-ring is of substantially triangular section and includes a frustoconical face for coming into contact with the frustoconical wall of the annular lip and a substantially radial face for pressing axially against radial faces of the upstream ends of the platforms of the blades.

5. A rotor wheel according to claim 1, wherein the annular lip is clamped axially against the rotor disk by an upstream cheek plate fastened to the rotor disk.

6. A rotor wheel according to claim 1, wherein the blades are made of ceramic matrix composite material.

7. A turbine engine, an airplane turboprop, or a turbojet, comprising at least one rotor wheel according to claim 1.

8. A rotor wheel according to claim 1, wherein the radial annular wall of the annular rim of the annular lip includes an anti-rotation finger projecting radially inward which is received circumferentially between two adjacent lugs.

* * * * *

UNITED STATES PATENT AND TRADEMARK OFFICE
CERTIFICATE OF CORRECTION

PATENT NO. : 9,726,033 B2
APPLICATION NO. : 14/357113
DATED : August 8, 2017
INVENTOR(S) : Alain Dominique Gendraud et al.

It is certified that error appears in the above-identified patent and that said Letters Patent is hereby corrected as shown below:

Column 6, Line 21, in Claim 4 change "according to claim, wherein" to --according to claim 3, wherein--.

Signed and Sealed this
Tenth Day of April, 2018

Andrei Iancu
*Director of the United States Patent and Trademark Office*